Oct. 15, 1940.   I. J. SNADER   2,217,973
MACHINE TOOL
Filed March 15, 1938   2 Sheets-Sheet 1

INVENTOR
Ira J. Snader
BY
Harness, Dickey & Pierce
ATTORNEYS.

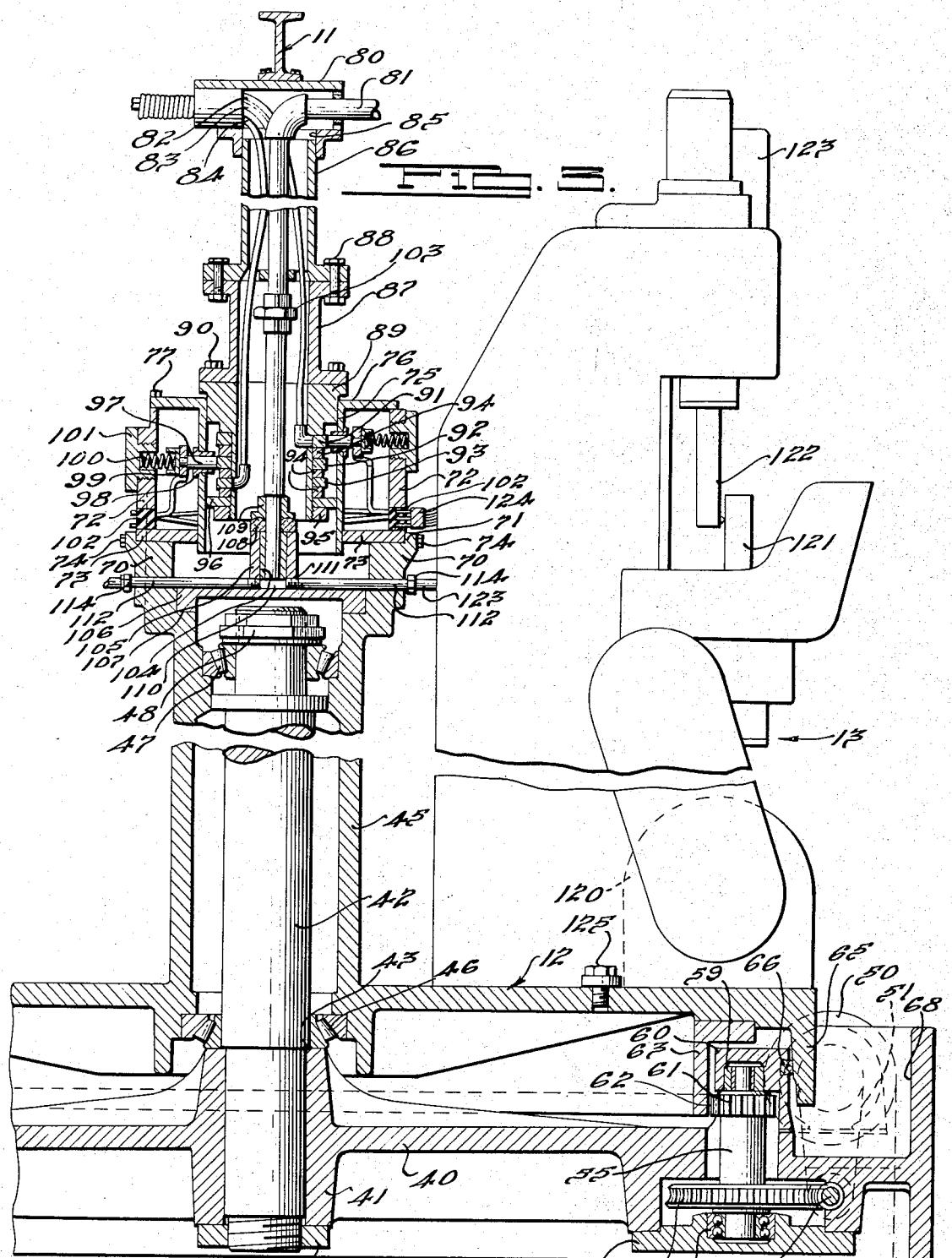

Patented Oct. 15, 1940

2,217,973

UNITED STATES PATENT OFFICE 2,217,973

MACHINE TOOL

Ira J. Snader, Detroit, Mich., assignor to Ex-Cell-O Corporation, Detroit, Mich., a corporation of Michigan Application March 15, 1938, Serial No. 196,033

5 Claims. (Cl. 29—33)

The invention relates generally to metal working and it has particular relation to machinery for operating on a number of work pieces simultaneously.

One object of the invention is to provide an arrangement of machine tools on a movable support wherein each machine tool is a separate and self-contained entity.

Another object of the invention is to provide an arrangement such as characterized previously wherein the machine tools are so designed that any one of them can be removed from the movable support and used elsewhere, such as in a stationary position.

Another object of the invention is to provide such an arrangement wherein removal or replacement of any machine tool will not interfere with the operation of the remaining tools.

And in general it is an object of the invention to provide an arrangement of machine tools which will enable obtaining greater efficiency by rendering it possible for an operator to control and operate a greater number of machine tools.

Other objects of the invention will become apparent from the following specification, the drawings relating thereto, and from the claims hereinafter set forth.

For a better understanding of the invention, reference may be had to the drawings wherein:

Fig. 3 is a cross-sectional view on a larger scale taken substantially along the line 3—3 of Fig. 2;

Figure 1:
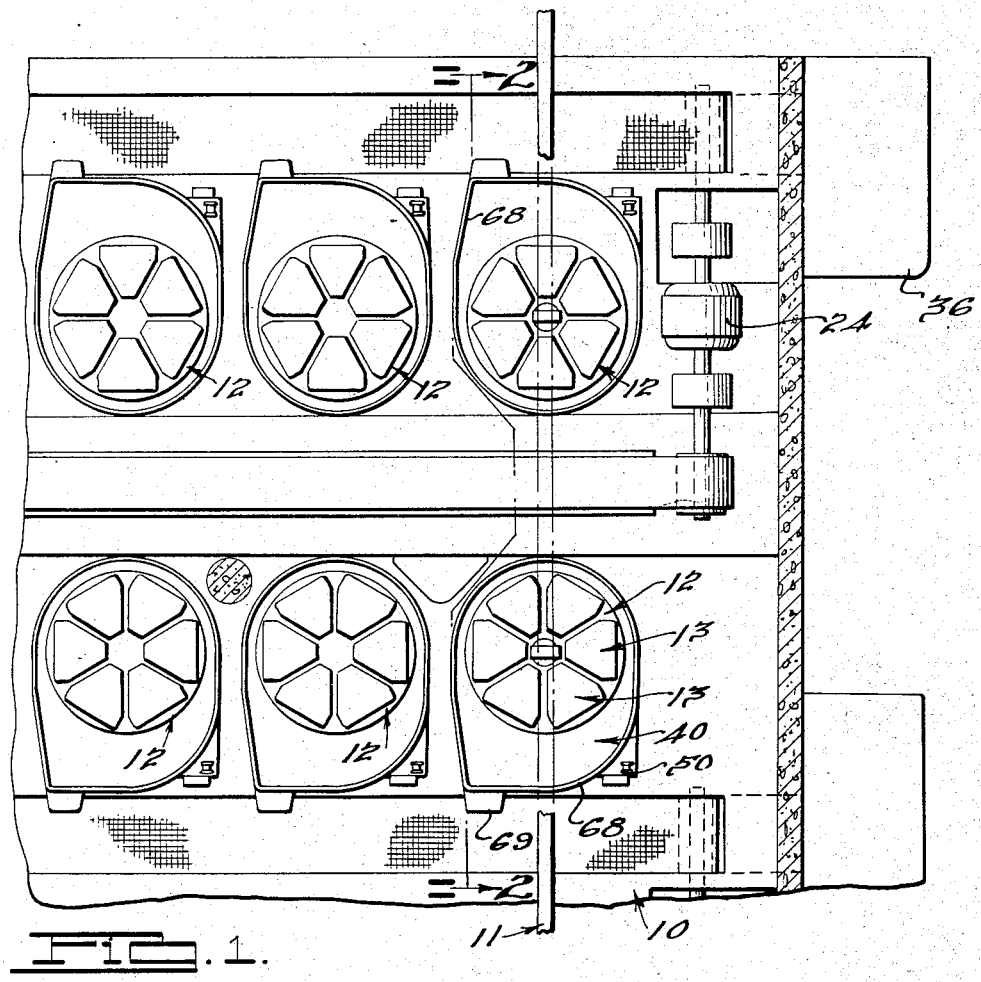
Figure 1 is a fragmentary plan view, partly diagrammatic, illustrating a system and arrangement of machine tools as constructed according to one form of the invention.
Figure 2:
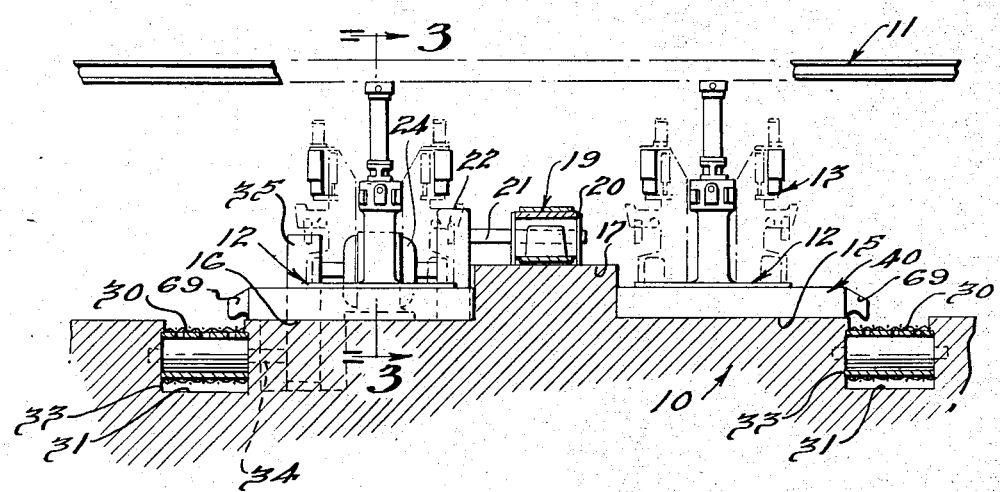
Fig. 2 is a cross-sectional view, taken substantially along the line 2—2 of Fig. 1.

Referring to Figs. 1 and 2, the floor of a building is indicated generally at 10 and preferably this is constructed of concrete so as to provide a firm foundation. While the roof of the building is not shown, an upper beam 11 is illustrated and this may be a part of the roof framework. Generally the system and arrangement illustrated comprises spaced rows of rotary turntables 12, with each turntable carrying a series of machine tools, indicated generally at 13. Such machine tools may be designed or set up to perform different or like metal working operations and, for instance, all of the machine tools on one rotary table may perform like operations on like work pieces, while all of the machine tools on the next turntable may be performing another operation on pieces of such work that have been operated on by the machine tools on the first turntable. Again, an entire row of turntables may be performing given operations on a certain type of workpiece, while an adjoining row of turntables may be performing other operations on such work pieces, or operations on a different piece of work. A wide variation in the use of the system and arrangement will generally be understood from the foregoing, and it will be appreciated more clearly from the description hereinafter.

Referring now to Fig. 2, it will be noted that the two rows of turntables are mounted on surfaces 15 and 16 while between such surfaces an elevated surface or platform 17 is provided. Along this elevated surface 17, a conveyor 19 is provided which travels around drums 20, provided at the ends of the platform, and, as will be understood, intermediate drums or guides may be provided for supporting the conveyor between its ends. This conveyor may be driven or it may be of such character that it may be pushed along manually by an operator, as required. The conveyor is shown as being power driven and a means for driving it may comprise a shaft 21 keyed to one of the drums 20, a reduction gearing 22, and a motor 24. Attention is directed to the fact that the elevated surface 17 and the conveyor 19 are so arranged that sufficient space is provided at each side of the conveyor to enable workmen to stand and also walk along the row of turntables, as it is intended that insertion and removal of the work from the different machine tools, and in general the control of the operation thereof, be effected by workmen in position on the elevated surface.

A chip receiving conveyor 30 is provided at the back of each row of turntables and this conveyor may be disposed in a long recess 31 in the foundation 10 and be trained around drums 33 at the ends of the recess. For driving the conveyor, one of the drums is keyed to a shaft 34 which in turn is connected to a reduction gearing 35, in turn connected to the shaft of motor 24. The conveyor is adapted to retain chips disposed thereon but allows coolant to fall into the recess below the conveyor. It is apparent that the conveyor 30 may deposit the chips at one end thereof and that the recess may lead to a coolant sump 36 where a pump may be provided to deliver coolant to the machine tools.

It seems desirable at this time to state generally that each of the machine tools is a self contained, power driven mechanism, having a cutting tool for performing an operation on the work and a support for the work, and means for advancing the work and cutting tool relatively during the work performing operation and for retracting the tool at the end of the work performing operation so as to enable a workman to remove the finished work piece and to place another in position on the work support. Each tool, for example, may be a boring machine or an external cutting machine, wherein at the end of the cutting operation the work turning or tool turning means, as the case may be, automatically stops, and it additionally may include a means for automatically returning the cutting tool or work to its original position, so that upon completion of the work cutting operation, the parts are again in position to operate on a new piece of work substituted for the finished work. Assuming that the table is constantly rotating at a predetermined and relatively slow speed, it is apparent that as each machine tool 13 passes by the elevated surface 17, the workman may remove the finished workpiece and insert a new one, and start the machine tool operating on the new workpiece. It will be possible to have the speed of the turntable such, or the character of the work performing operation such, that as each machine tool completes one rotation, its work is finished. Moreover, one workman may control the machine tools on a number of tables depending upon the character and speed of the work being performed. With each machine tool of self contained and individual character, and not dependent upon the operation of any other machine tool, it is clear that the workman is operating a series of machine tools that are brought to him by the rotation of the turntables and that this is done so efficiently that he is able to control and operate a maximum number of machine tools. It is intended that the system so operate that insertion and removal of work pieces may be accomplished without cessation of table movement, although it should be understood that a control governing movement of the table may be accessible adjacent the elevated surface 17 to permit the workman to stop and start the table at any time. Due to the fact that each machine tool is self contained and is individually operated, it is apparent that even though the workman may not be in position to remove a workpiece and insert a new one when one machine tool advances past the elevated surface 17, no undesirable result will obtain except that the machine tool will merely continue its movement around the table and have an idle advance until it again reaches the elevated surface.

Now referring particularly to Fig. 3, the turntable 12 is rotatably supported and driven in the following manner. A stationary base 40 is provided that has a hub portion 41 at its center which receives the lower end of a vertically projecting post 42. This post has a shoulder 43 resting on the upper end of the hub 41 while the lower end of the post is threaded and receives a nut 44, from which it follows that the post is firmly anchored on and supported by the hub 41. At its center the table 12 has a hollow column 45 projecting vertically above it and this column receives the upwardly projecting post 42. Tapered roller bearings 46 and 47, adjacent the lower and upper ends of the column, rotatably support the latter and table on the post 42 and hub 41. Adjustable fastening means 48, which may comprise nuts threaded on the upper end of the post 42, hold the roller bearings and races therefor in close fitting relation, and it will be evident that while rotary movement of the table with respect to the base 40 and post 42 is permitted, vertical movement of the table with respect to the base is prevented.

For driving the rotary table, a motor 50 at one side of the base 40 is employed which is drivingly connected such as by a chain or belt 51 to a worm shaft 52 that projects through an opening in the lower side of the base. The worm on shaft 52 meshes with a worm wheel 54 disposed in a recess on the under side of base 40 and the wheel is fastened on a vertically projecting shaft 55, which at its lower end is journalled in a bearing 56 provided in a cap plate 57 that is secured to the under side of the base. The shaft 55 at its upper end is journaled in a bearing 59 that is anchored in an upwardly projecting rim 60 on the base, and adjacent the bearing, a pinion 61 is fastened to the shaft 55 and the teeth on this pinion mesh with teeth 62 of a ring gear 63 that is fastened on the under side of the table 12. From this description, it will be apparent that operation of the motor will impart rotary movement to the table 12.

At its outer edge, the table 12 is provided with a depending flange 65 and between this flange and the rim 60 on the base, a sealing ring 66 may be interposed to prevent coolant from passing upwardly beyond the seal. The base 40, at its outer edge, is provided with an upwardly projecting flange 68 and this flange and the rim 60 provide a trough for receiving coolant and chips resulting from operation of the machine tools. For allowing chips and coolant to pass from the trough to the conveyor 30, a spout 69 is provided (as shown by Fig. 2) which extends over the conveyor. Attention is directed to the fact that the trough is wider at the rear side of the table (as shown by Fig. 1) so as to accommodate a large amount of chips and it is evident that chips around the table may be pushed to the rear and into the larger part of the trough, from which occasionally they may be pushed onto the conveyor.

At its upper end, the column is enlarged, as indicated at 70, and the end face of the enlarged portion is bordered by an outer flange 71. A cylindrical member 72, having an inwardly directed and centrally open lower end wall 73, rests on the end face of such larger portion 70 of the column and within the flange 71 and is releasably fastened to the column by screws 74 passing through the flange. An inner cylindrical member 75 is disposed within the cylinder 72 and at its upper end has an outwardly directed flange 76 which rests on the upper end of the latter. Screws 77, passing through the flange 76, hold the latter and cylinder 72 releasably connected.

Directing particular attention to the upper end of Fig. 3, it will be noted that a tubular element 80 is fastened to the beam 11 and that a pipe 81 enters one end of the tubular element 80 while electric wires 82, 83, and 84, enter the other end of the element. The pipe 81 and wires extend downwardly through an opening 85 in the lower wall of the tubular element and through a pipe section 86 fastened thereto and this pipe section at its lower end is flanged and is releasably fastened to a still lower section 87 by means of bolts 88. A tubular member 89, constructed of insulating material, is releasably fastened to section 87 by screws 90 and projects downwardly within cylinder 75, but is held against rotation therein due to its connection to section 87. Inwardly of cylinder 75, the member 89 has a reduced wall diameter and is provided with metal commutator rings 91, 92, and 93 that are respectively connected to the wires 82, 83, and 84. Between the metal commutator rings, rings 94 of insulating material are provided, and the assembled rings are held in position by means of a nut 95 on the lower end of the member 89. A ring 96 may be placed between the lowermost insulating ring 94 and the nut 95 so as to provide a device for centering and sealing the lower end of the insulating cylinder on the inner surface of cylinder 75. From this it will be seen that the wires 82, 83, and 84 lead to stationary commutator rings adjacent the rotary cylinder 75 on the upper end of column 45.

In order to connect these commutator rings to each of the machine tools on the table 12, a brush 97 slidably projects through an insulating bushing 98 disposed in an opening in cylinder 75, and the outer end of this brush has a cup 99 thereon of insulating material which receives one end of a spring 100. The other end of the spring is disposed in an opening in a cap plug 101 threaded into an opening in the outer cylinder 72. Thus, the spring resiliently holds the brush 97 in contact with the commutator ring. Brushes of this character contact the several commutator rings and each brush is connected to a wire, so that three wires lead from the commutator rings. For electrically connecting the machine tools to the power lines thus terminating in stationary terminals, a plurality of connectors 102 are provided in the wall of cylinder 72 and the three wires are connected to these connectors.

The pipe 81, extending downwardly through the sections 86, 87, and 89, has a coupling 103 intermediate its ends, so that it may be readily disconnected, and at its lower end it projects into a bearing element 104 disposed in an upwardly projecting tubular portion 105 formed on a plate 106 that is held in a recess 107 in the upper end of the column 45. Above the projection 105, a packing 108 is held against the end face of the latter by a retainer 109 on the pipe, so as to prevent leakage upwardly past the projection. The lower end of the pipe 81 communicates with a recess 110 in plate 106 and this recess is in communication with laterally projecting pipes 112 connected thereto. In other words, a plurality of pipes 112 project radially from the recess 110. Such pipes extend through the side wall portion 70 of column 45 and may have couplings 114 by means of which each pipe may be readily connected to a receiving pipe on one of the machine tools. It is to be observed that the releasable connections in general above column 45 readily permit assembly and disassembly of the parts so as to facilitate installation and repairs.

While Fig. 3 shows the turntable and column arrangement specifically, the machine tools on the table are shown only more or less diagrammatically for the reason that they may vary and be used for different purposes. The diagrammatic showing does indicate a motor 120 employed for rotating the work indicated at 121, and a reciprocatory tool 122 adapted to cut the exterior surface of the work. For reciprocating the tool, hydraulically operated means 123 may be used, and fluid pressure for operating the hydraulic means may be obtained by means of a pump within the tool casing that is actuated by the motor 120 or by a second electric motor within the casing. Automatic means may be employed for stopping the work and reversing the action of the tool after it has completed its work stroke and manual means may be employed for starting the tool advance and rotation of the work after a new workpiece has been inserted. Coolant is delivered to the tool from a pipe 112 through a connection 123, and an electrical plug 124 having three terminals may be provided on the machine tool for connection with a connector 102. Each machine tool may be fastened on the table 12 by means of bolts 125 in a manner to be readily understood, and after removing these bolts, disconnecting the coupling 114, and removing plug 124, it is evident that the machine tool may be bodily removed and placed on the floor and operated as a single unit. Attention is directed to the fact that the column is polygonal in shape and that the foundation or base of the tool is triangular in shape with the inner apices flat, and this enables placing the tools around the column in closely nested relation and also close to the center.

Although only one form of the invention has been illustrated and described in detail, it will be apparent to those skilled in the art that various modifications may be made without departing from the scope of the appended claims.

What is claimed is:

1. In combination, a turnable table, power driven means for turning the table, a plurality of individual power driven machine tools mounted on the table with each tool having individual and self contained power driven means independent of the other tools, and means releasably mounting each tool on the table so that it may be removed and replaced at will, said tools being arranged in a circumferentially extending series and each tool having a vertically extending base or support provided with sides converging towards the center of the series so that the tools can be arranged close together and close to said center.

2. In combination, a turnable table, power driven means for turning the table, a column mounted on and projecting vertically from the table, a plurality of individual power driven tools mounted on the table with each tool having individual and self contained power driven means independent of the other tools and each being controlled entirely independently of any turning of the table, said tools being arranged around the column and each tool having a vertical base provided with sides converging toward the column so that a greater number of tools can be arranged close together and close to the column, power supply lines leading to the column, means releasably connecting the power driven means of each tool to the power supply lines on the column, and means releasably securing each tool to the base so that it may be removed and replaced as a complete unit at will.

3. In combination, a turnable table, power driven means for turning the table, a column mounted on and projecting vertically from the table, a plurality of individual power driven machine tools mounted on the table in a circumferential series around the column, each of said tools having individual and self-contained electrical motor driven means independent of the other tools excepting for an electrical connection for supplying electric current to the motor, means including a releasable electrical connection on the column for supplying electric current to the electric motor of each tool, means for releasably securing the tools on the table, each of said tools being so constructed and arranged as an entity that it may be quickly removed as a complete unit from the table and placed on a floor or other support and operated as a single unit separately of the table, and each of the tools having sides converging to the back of the tool so that the tools arranged on the table have sides converging towards the center of the table whereby the tools may be arranged in closer relation and closer to the center of the table.

4. In combination a turnable table, power driven means for turning the table, and a plurality of column like individual power driven machine tools mounted on the table in a circumferential series, each of the tools having sides converging towards the center of the table so that the tools may be arranged in closer relation and closer to the center of the table, each tool also having individual and self contained electrical motor driven means including a motor located at the base of the tool and at the front thereof so that the motor may be accommodated by the wider sides of the tool.

5. In combination, a turnable table, power driven means for turning the table, a plurality of column like individual power driven machine tools mounted on the table in a cercumferential series, each of the tools having sides converging towards the center of the table so that the tools may be arranged in closer relation and closer to the center of the table, each tool also having an electric motor at its base, a vertically disposed rotary work support above the motor and driven thereby, a vertically reciprocatory cutter to engage the work, and means above the work for vertically reciprocating the cutter, said motor, support, cutter, and cutter reciprocating means being at the front of the tool so as to not interfere with providing said converging sides on the tool.

IRA J. SNADER.